US012743351B2

(12) United States Patent
Hebbar et al.

(10) Patent No.: US 12,743,351 B2
(45) **Date of Patent: *Sep. 22, 2026**

(54) SCALABLE DATA MIGRATION TO THE CLOUD

(71) Applicant: Truist Bank, Charlotte, NC (US)

(72) Inventors: Nagaraja Hebbar, Atlanta, GA (US); Sweta Sharan, Atlanta, GA (US); Alka Nagar, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/933,027

(22) Filed: Oct. 31, 2024

(65) Prior Publication Data

US 2026/0119323 A1 Apr. 30, 2026

(51) Int. Cl.
*G06F 11/20* (2006.01)
*G06F 11/07* (2006.01)
*G06F 11/14* (2006.01)

(52) U.S. Cl.
CPC ........ *G06F 11/203* (2013.01); *G06F 11/0793* (2013.01); *G06F 11/1435* (2013.01)

(58) Field of Classification Search
CPC ......................... G06F 11/1435; G06F 11/0793
See application file for complete search history.

(56) References Cited

U.S. PATENT DOCUMENTS

| | | | | |
|---|---|---|---|---|
| 11,526,470 | B2 * | 12/2022 | Lee | G06F 16/1844 |
| 12,271,720 | B1 * | 4/2025 | Silver | G06F 8/60 |
| 2019/0018394 | A1 * | 1/2019 | Sayyarrodsari | G05B 19/41885 |
| 2019/0205429 | A1 * | 7/2019 | Lee | G06F 16/214 |
| 2020/0233600 | A1 * | 7/2020 | Swamy | G06F 3/067 |
| 2022/0004383 | A1 * | 1/2022 | Esponda | G06F 8/77 |
| 2022/0245033 | A1 * | 8/2022 | Zou | G06F 11/1464 |
| 2023/0061136 | A1 * | 3/2023 | Abdollahian Noghabi | G06F 9/5027 |

* cited by examiner

*Primary Examiner* — Maher N Algibhah
(74) *Attorney, Agent, or Firm* — Nicholas Martin; Greenberg Traurig, LLP

(57) ABSTRACT

A computer implemented method includes receiving, by the processor, a request to initiate a migration of data. The method also includes receiving, by the processor, data identified in the request to initiate a migration. The method also includes generating, by the processor, a file-out of the data by converting the data from a proprietary schema into a commonly understood schema. The method also includes migrating, by the processor, at least a portion of the file-out to a cloud provider. The method also includes validating, by the processor, the migration of the file-out to determine whether the migration is successful, and in response to validating the migration, generating, by the processor, a migration response indicating whether the migration was successful.

20 Claims, 3 Drawing Sheets

SCALABLE DATA MIGRATION TO THE CLOUD

TECHNICAL FIELD

The present disclosure relates generally to data storage and, more particularly, although not necessarily exclusively, to large data migration to the cloud.

BACKGROUND

Traditional payment processing systems often rely on on-premises databases managed by vendor applications, which can be challenging to scale. These systems typically face limitations in handling custom data sets and meeting stringent security requirements. The migration of such systems to cloud environments is complicated by inefficiencies in data transfer, validation, and integrity maintenance.

SUMMARY

In an example, a computing device includes a processor and a non-transitory computer-readable medium including instructions that are executable by the processor for causing the processor to receive, from a user interface (UI) application, a request to initiate a migration of data. The instructions can further cause the processor to receive, from a first database, data identified in the request to initiate a migration. The processor can also generate a file-out of the data by converting the data from a proprietary schema into a commonly understood schema and migrate at least a portion of the file-out to a cloud provider. The instructions can further cause the processor to validate the migration of the file-out to determine whether the migration is successful, and in response to validating the migration, generate a migration response indicating whether the migration was successful.

In an additional example, a computer implemented method includes receiving, by the processor, a request to initiate a migration of data. The computer implemented method can also include receiving, by the processor, data identified in the request to initiate a migration. The method can further include generating, by the processor, a file-out of the data by converting the data from a proprietary schema into a commonly understood schema. The computer implemented method can also include migrating, by the processor, at least a portion of the file-out to a cloud provider. The computer implemented method can also include validating, by the processor, the migration of the file-out to determine whether the migration is successful, and in response to validating the migration, generating, by the processor, a migration response indicating whether the migration was successful.

In an additional example, a non-transitory computer-readable medium may include instructions that are executable by a processing device for causing the processing device to receive, from a user interface (UI) application, a request to initiate a migration of data. The instructions can further cause the processing device to receive, from a first database, data identified in the request to initiate a migration. The instructions can further cause the processing device to generate a file-out of the data by converting the data from a proprietary schema into a commonly understood schema. The instructions can further cause the processing device to migrate at least a portion of the file-out to a cloud provider. The instructions can further cause the processing device to validate the migration of the file-out to determine whether the migration is successful, and in response to validating the migration, generate a migration response indicating whether the migration was successful.

DETAILED DESCRIPTION

Figure 1:
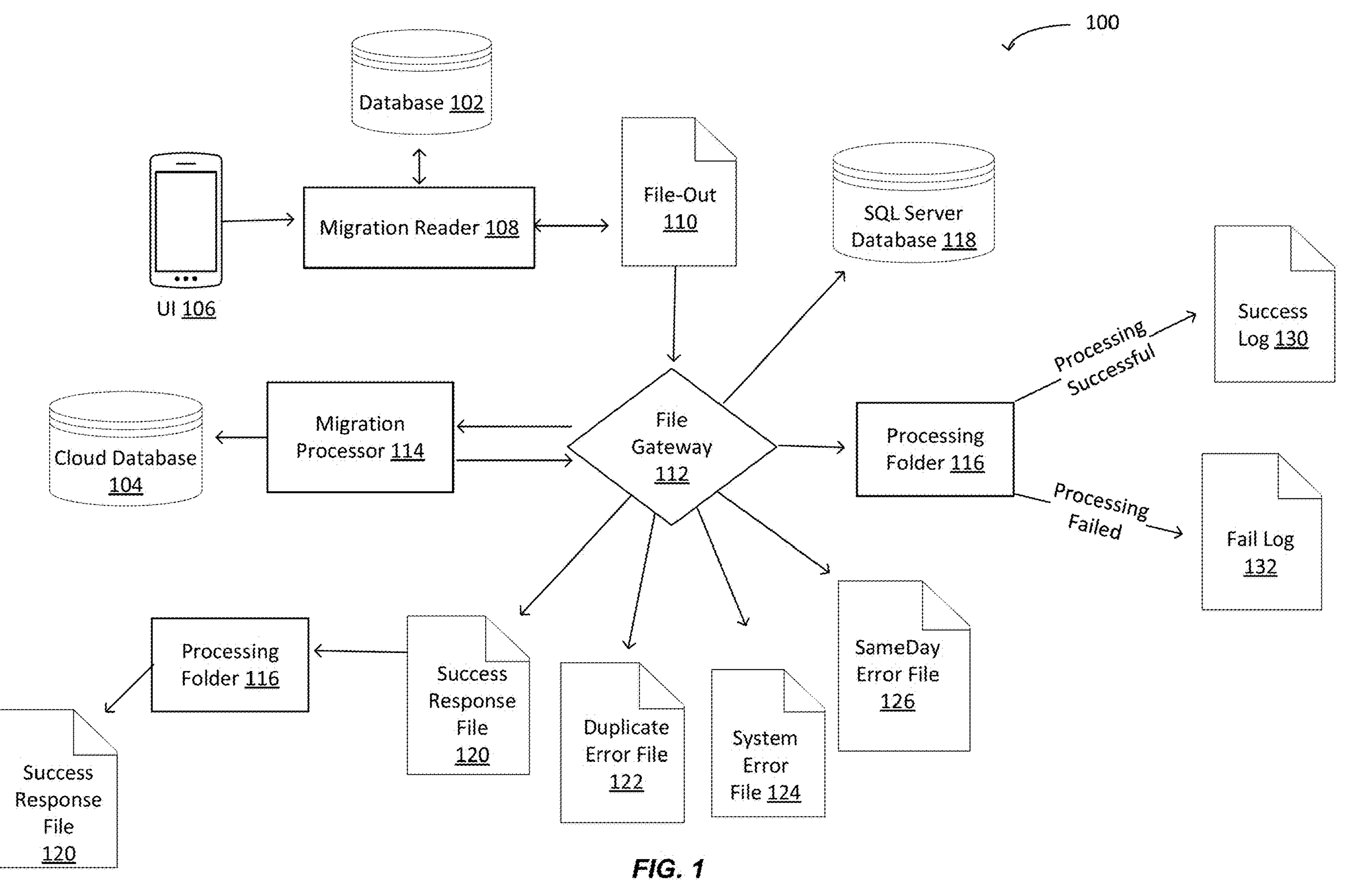
FIG. 1 is a block diagram of a system for migrating data to the cloud, according to some embodiments.

Certain aspects and examples of the present disclosure relate to migrating a data processing service from an on-premises database to a cloud-based environment. To illustrate, consider a large amount of data is being stored at an on-premises database, however, the on-premises database is limited in size and functionality. Moving the large amount of data to a second, cloud database requires a specific method for securely and efficiently transferring the data. This can be caused by, for example, the data being data transaction data which is confidential. Additionally, the migration may be difficult to the volume of data and the processing capacity of a system.

The techniques described by this disclosure may provide an efficient mechanism to migrate large amounts of data from an on-premises database to a database within a cloud infrastructure. In this manner, the presently disclosed techniques may overcome limitations posed by custom data and security requirements of an on-premises database while handling confidential data. This migration allows for more resources to be available to a user whose data is migrated to the cloud database.

Although the examples in this disclosure relate to transactions, it would be understood by someone of ordinary skill in the art that the embodiments described herein are applicable to other datasets. For example, a mass update or transfer of large amounts of data from one source to another may use similar techniques.

The migration process can begin with a migration reader, which reads the proprietary schema from the on-premises database and converts the data into common data schema. The migration may be initiated by a UI-based application that allows administrators to specify migration parameters such as date ranges and entity selections. The converted data may be stored in a designated file storage location for the next stage of processing.

A cyber-physical systems (CPS) file gateway may be used to read the stored files and convert them into a structure compatible with a cloud-based CPS database. The gateway may stream data asynchronously via a third party message queue to the cloud. During this process, the system can perform necessary validations, duplicate checks, and data enrichment to ensure the integrity and accuracy of the migrated transactions. The bulk data can then be persisted in the cloud database, with responses sent back indicating the success or failure of each transaction.

The embodiments described herein are designed for high scalability, capable of handling millions of transactions efficiently. Multiple processor and readers can be employed based on the volume of data, and the migration process may be executed, for example, during off-peak hours to minimize user experience impact. As a result, the on-premises database may be gradually decommissioned as transactions are successfully migrated, with new transaction data being directly processed in the cloud database.

The embodiments described herein are adaptable for various scenarios, including for use in data updates and organizational mergers. The system can employ advanced error control mechanisms to ensure the reliability and integrity of data during the migration process. A management tool may control the timing of file processing to ensure optimal performance, and error handling mechanisms are in place to address any migration failures. Operators can manually review and correct failed transactions, ensuring continuous and accurate data processing. Alternatively, operators can automatically review and correct failed transactions. Thus, the embodiments provide a robust and scalable solution for migrating data processing services to the cloud, enhancing efficiency and security.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of a system 100 for migrating transaction data to the cloud, according to some embodiments. The embodiments described herein focus on migrating a data processing service from an on-premises database 102 to a cloud-based database 104. This migration addresses the inefficiencies and security limitations of existing on-premises systems, providing a scalable solution for handling large amounts of data. Conventional systems are limited by legacy systems and hold vast amounts of confidential data that should be transferred confidentially and efficiently. Additionally, it may be desirable to control the migration of vast amounts of data in a way that reduces latency and is considerate of other processing requirements at a given time. One of the primary challenges in migrating such data is migrating complex and custom transactions to the cloud while ensuring data integrity and security. Existing systems may be inadequate for this purpose due to their inability to handle the specific requirements of an organization's transactions.

A migration may be initiated and controlled through a user interface (UI) application 106. The UI application 106 may allow administrators to specify various parameters, such as the date range and client selection, ensuring a tailored and efficient migration process.

According to some embodiments, a migration reader 108 reads the proprietary schema of data from the on-premises database 102. The migration reader 108 may convert the proprietary schema of data from the on-premises database 102 into a common data schema or a compatible structure that can be understood, read, and processed by the cloud-based system. The migration reader 108 can include an error detection algorithms to identify and correct any discrepancies in the data before conversion. Once the data is converted, the migration reader 108 can output a file-out 110 of the converted data which can be stored in a designated file storage location. The file-out 110 may be ready for further processing and migration to the cloud environment.

In an example, a file gateway 112 can pre-process the file-out 110. The file gateway 112 can read the stored files and convert the stored files into a structure compatible with the cloud-based CPS database. The file gateway 112 may be controlled by structured query language (SQL) server database 118, which is a management tool that can determine when and what files should be picked up by the file gateway 112. The file gateway 112 can read each line in the file-out 110 and send each line to the migration processor 114. In an example, the migration processor 114 may be a bulk data migration processor and the data may be streamed asynchronously to the migration processor 114. This asynchronous process helps with avoiding overload of the system. By processing tasks asynchronously, instead of waiting for each task to finish before starting the next one, the system can manage multiple tasks at the same time. Asynchronous processing allows the system to handle increasing amounts of work without a significant drop in performance. Asynchronous processing can further enhance error control techniques that continuously monitor data integrity and provide real-time error correction to maintain system reliability.

The migration processor 114 can be configured to implement various validation steps during the streaming process. The validation steps can include ensuring that the system has the appropriate permissions to migrate the data, that the data has not already been migrated, and so on. The migration processor 114 can validate, transform, and enrich the data and can create the data on the cloud database 104. In an example, an identification code of the data may be used to determine permissions related to the data such as whether the migration of a particular file-out 110 is allowed to proceed based on the permissions of the identification code. The migration processor 114 may then send back a response to the file gateway 112 indicating whether the migration was successful or whether the migration failed. The response may indicate how much data and what data was successfully migrated to the cloud database 104. Throughout the migration process, the data can include an identification code that is used to track the migration. In an example, the migration response can further include the identification code, and a record of the successful migration may be stored including the identification code in, for example, an audit log. Similarly, migration responses for failed migrations can include an identification code for the data. In the way, a clear trail of the failed and successful migrations of data can be maintained. Additionally, the file gateway 112 can utilize error-checking protocols to verify the accuracy of the data being transferred to the cloud, ensuring that only validated files are processed. During the validation and enrichment stages, the system can implement redundancy checks and error correction codes to prevent data loss and ensure the accuracy of the migrated transactions.

As described above, the migration response can indicate whether the migration was successful or not. In response to receiving a notification of a failed migration, the data may be scanned by the file gateway 112 to identify defects in the data. Once a defect is identified, a remediation operation may be performed on the file-out 110 to correct the data and generate a remediated file-out 110 where the data has been edited to remove any defects. The remediated file-out 110 can then be migrated to the cloud provider.

Once a response is received by the file gateway 112, the file gateway 112 can then process the response and write the response into separate files. This step involves analyzing the response to determine whether there were any issues and what the issues were in the migration process. Based on the response, the file gateway 112 can store the response data. For example, there may be a duplicate data error responses. Such duplicate data error response may be stored in the duplicate data error response file, duplicate error file 122. Additional errors and corresponding files may include, for example, same day error file 126 and system error file 124.

A response of a successful migration may be stored in a success response file 120. After all the data is written, success response file 120 may be moved to a processed folder 116. The processed folder 116 may be sent back to the database 102 to notify of the successful migration to the cloud database 104 and to close the transaction at the database 102.

According to some embodiments, multiple processors and readers can be available based on the volume of the data, allowing the system to manage millions of transactions efficiently. The processors and readers can be located in the cloud and cloud-based processors, for example, can be scaled up or down based on the workload. The file-out 110 can be sent to the cloud using a data transfer protocol and cloud-based readers can be configured to read multiple files simultaneously. The cloud-based processors process the data received by the readers and can perform tasks such as validation, data enrichment, duplicate checks, and converting the data into the final format required by the cloud database. The scalable architecture of the system can be designed with robust error control features that allow the system to handle high volumes of transactions without compromising on data accuracy or reliability Additionally, to minimize user impact, the migration process can be executed during off-peak hours. This management ensures that the system's performance is not compromised and that the users do not experience disruptions in their data processing activities. Similarly, in the cloud environment, resources can be allocated dynamically.

For example, when a system detects an increase in transaction volume, it can automatically deploy additional processors and readers to handle the load. As described above, the migration system can be adapted for various scenarios such as organizational mergers and daily data updates. This flexibility makes the system a valuable tool for managing different types of data migration.

According to some embodiments, the system may be configured to handle potential errors or migration failures. In an example, operators can manually review and correct failed transactions. Alternatively, operators can automatically review and correct failed transactions. One or more error handling mechanisms can include automated retry attempts, error logs, and alerts to ensure quick identification and resolution of any issues that may arise during the migration process. Additionally, audit trails can be maintained, incorporating error detection and correction records to provide a transparent and reliable history of the migration process. As illustrated in FIG. 1, once a migration response is received by file gateway 112, processing folder 116 may process the response and determine whether the file was processed successfully or not. The successful and failed migration responses may then be stored in an audit log such as success log 130 and fail log 132.

If a migration has failed, the data may be re-processed and/or updated and the migration may be attempted again. As described above, the file-out 110 can be remediated and the remediated file-out 110 can be migrated to the cloud database. In response to validating the migration, an updated migration response can be generated to indicate whether the new attempt at migration was successful. When a migration has succeeded, the data may be deleted from the first database to ensure that the data is not duplicated, a record of the successful migration may be stored in an audit log to keep track of migration.

Figure 2:
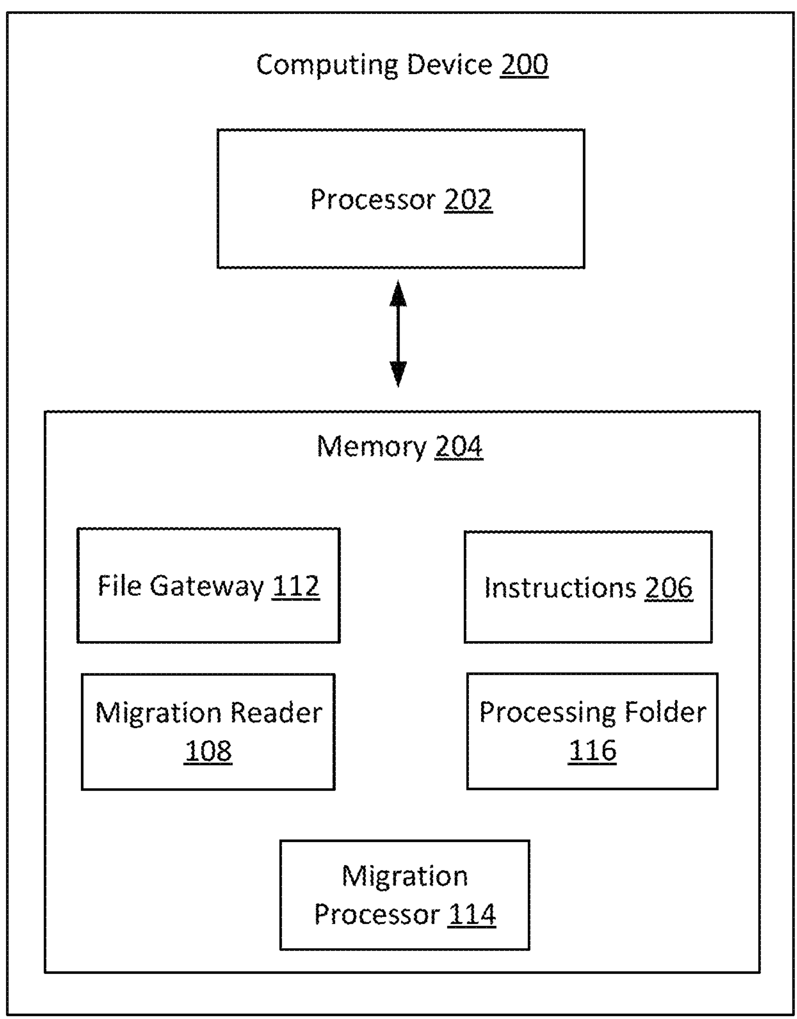
FIG. 2 is a block diagram of a computing device with instructions for migrating data to the cloud, according to some embodiments.

FIG. 2 is a block diagram of a computing device 200 with instructions for migrating transaction data to the cloud, according to some embodiments. The computing device 200 includes a processor 202 that is communicatively coupled to a memory 204. In some examples, the processor 202 and the memory 204 may be distributed from (e.g., remote to) one another.

The processor 202 can include one processing device or multiple processing devices. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in a suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium from which the processor 202 can read instructions 206. A computer-readable medium can include electronic, optical, magnetic, or other storage devices capable of providing the processor 202 with computer-readable instructions or other program codes. Non-limiting examples of a computer-readable medium include magnetic disk(s), memory chip(s), read-only memory (ROM), random-access memory (RAM), an ASIC, a configured processor, optical storage, or any other medium from which a computer processor can read the instructions 206. The memory also includes a file gateway 112, a migration reader 108, a processing folder 116, and a migration processor 114.

Figure 3:
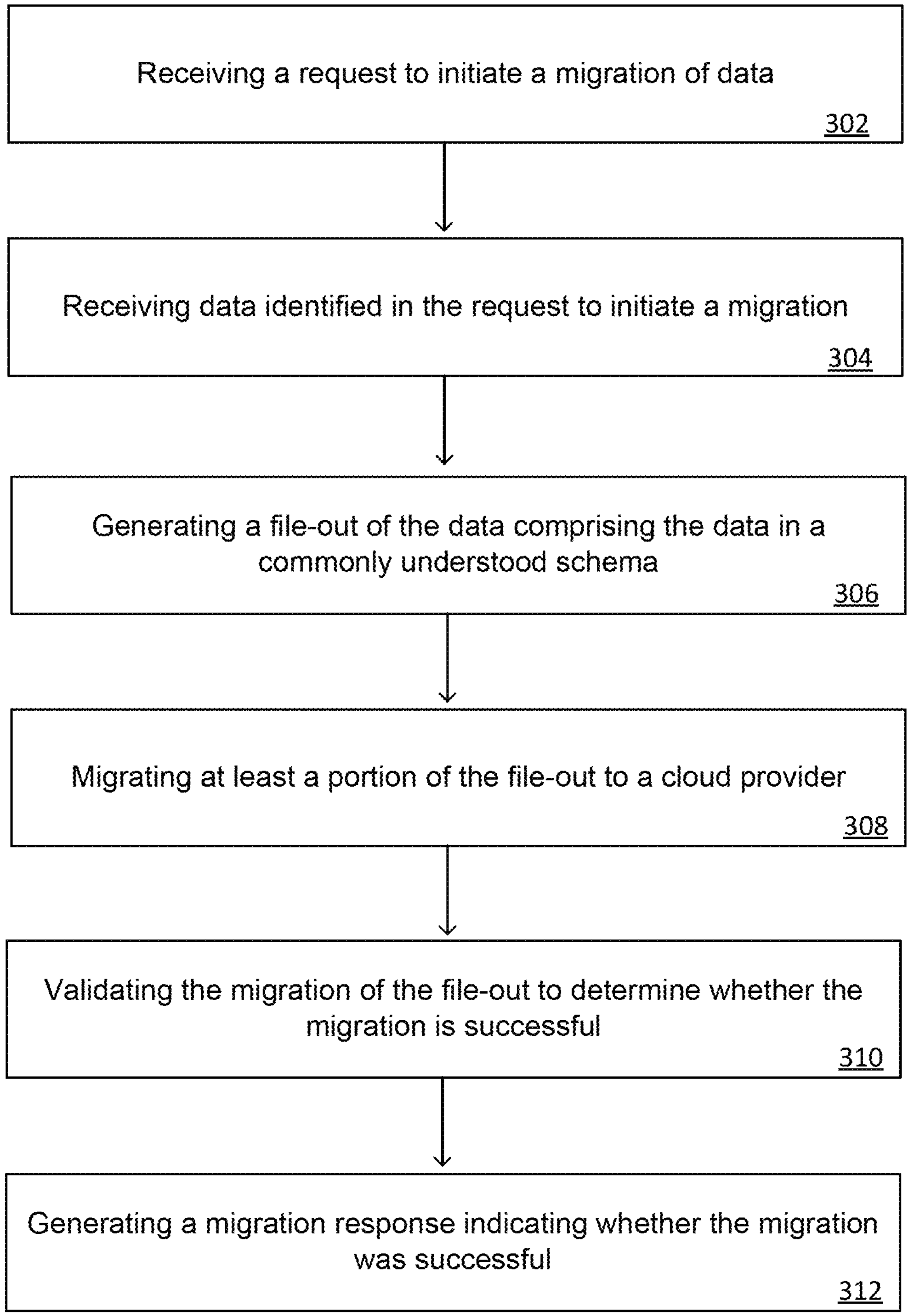
FIG. 3 is a flowchart of an example process for migrating data to the cloud, according to some embodiments.

FIG. 3 is a flowchart of an example process 300 for migrating transaction data to the cloud, according to some embodiments. Some examples may include more steps, fewer steps, different steps, or a different combination of steps than the blocks shown in FIG. 3. The blocks of FIG. 3 are described below with reference to the components of FIGS. 1 and 2 described above.

At block 302, the processor 202 may receive a request to initiate a migration of data from database 102 to database 104. The request may be received from UI application 106. The request received from UI application 106 can specify which data to migrate and when to migrate the data. For example, a user may select a specific client whose data to migrate and may select an off-peak hour(s) for imitating the migration.

The request may also be generated by a machine learning (ML) model which can be used to automatically generate the particular data and time to migrate. For example, a ML model can receive an indication of processing availability and cost at a given time as input and, using the provided information, output a schedule for data migration.

At block 304, the processor 202 may receive data identified in the request to initiate a migration. Based on the request, the specific data to be migrated can be provided to or otherwise accessed by the file gateway 112.

At block 306, the processor 202 may generate a file-out 110 of the data comprising the data in a commonly understood schema. The file gateway 112 can pre-process the data in the file-out 110. The file gateway 112 can read the stored files and convert them into a structure compatible with the cloud-based CPS database. The file gateway 112 may be controlled by the SQL server database 118 which is a management tool that can determine when and what files should be picked up by file gateway 112.

At block 308, the processor 202 may migrate at last a portion of the data in a commonly understood schema. The file gateway 112 can read each line in the file-out 110 and send each line of the file-out 110 to the migration processor 114. The migration processor 114 may be a bulk data migration processor and the data may be streamed asynchronously to migration processor 114. This asynchronous process helps with avoiding overload of the system.

At block 310, the processor 202 may validate the migration of the file-out to determine whether the migration was successful. The validation steps can include ensuring that the system has the appropriate permissions to migrate the data, that the data hasn't already been migrated, and so on. Migration processor 114 can validate, transform, and enrich the data and can create the data on cloud database 104.

At block 312, the processor 202 may generate a migration response indicating whether the migration was successful. Migration processor 114 may provide the response to the file gateway 112 indicating whether the migration was successful or whether the migration failed. The response may indicate how much data and what data was successfully migrated to the cloud database 104. Once a response is received by file gateway 112, the file gateway 112 can then process the response and write the response into separate files.

In some examples, this block involves analyzing the response to determine whether there were any issues and what the issues were in the migration process. Based on the response, the file gateway 112 can store the response data. For example, there may be a duplicate data error responses. Such duplicate data error response may be stored in the duplicate data error response file, duplicate error file 122. Additional errors and corresponding files may include, for example, same day error file 126 and system error file 124. A response of a successful migration may be stored in a success response file 120. After all the data is written, success response file 120 may be moved to a processed folder 116. Processed folder 116 may be sent back to database 102 to notify of the successful migration to cloud database 104 and to close the transaction at database 102. If a migration has failed, the data may be re-processed and/or updated and the migration may be attempted again. By further incorporating advanced error control and reliability measures, the system provides a robust solution for migrating data processing services to the cloud, ensuring data accuracy and system dependability.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computing device comprising:
a processor; and
a non-transitory computer-readable medium comprising instructions that are executable by the processor to cause the processor to:
receive, from a user interface (UI) application, a request to initiate a migration of data;
receive, from a first database, data identified in the request to initiate a migration;
generate a file-out of the data by converting the data from a proprietary schema into a commonly understood schema, such that the converted data is functionally compatible with a target cloud database environment;
migrate at least a portion of the file-out to a cloud provider, wherein the migration occurs asynchronously with respect to operations of the first database such that the at least the portion of the file-out is migrated independently without interrupting ongoing operations of the first database;
validate the migration of the file-out to determine whether the migration is successful; and
in response to validating the migration, generate a migration response indicating whether the migration was successful.

2. The computing device of claim 1, wherein the request to initiate a migration of data is generated by a machine learning (ML) model, wherein an input to the ML model is processing availability and cost, and wherein an output of the ML model is a schedule for data migration.

3. The computing device of claim 1, wherein the instructions are further executable by the processor to cause the processor to, in response to receiving a notification of a failed migration:
determine a cause of the failed migration by scanning the data to identify defects;
perform a remediation operation on the file-out to generate a remediated file-out by editing the data to remove any defects; and
migrate the remediated file-out to the cloud provider.

4. The computing device of claim 1, wherein the instructions are further executable by the processor to cause the processor to:
pre-process the file-out by reading each line in the file-out and sending each line of the file-out to a migration processor,
wherein the migration processor streams the data asynchronously to a cloud-based database during off-peak hours, and
wherein the migration processor performs a validation that the data has not already been migrated and that the computing device has permission to migrate the data.

5. The computing device of claim 1, wherein the instructions are further executable by the processor to cause the processor to, in response to receiving notification of a failed migration:
receive corrected data from a file processor;
generate a remediated file-out of the corrected data, wherein the remediated file-out comprises the corrected data in the commonly understood schema;
migrate at least a portion of the file-out to the cloud provider;
validate the migration of the file-out to determine whether the migration is successful; and
in response to validating the migration, generate an updated migration response indicating whether the migration was successful.

6. The computing device of claim 1, wherein the instructions are further executable by the processor to cause the processor to:
receive an identification code for the data, wherein the migration response further comprises the identification code; and
store a record of a successful migration including the identification code in an audit log.

7. The computing device of claim 6, wherein the instructions are further executable by the processor to cause the processor to:

in response to receiving notification of a failed migration of the data identified in the request to initiate a migration and received from the first database:

determine a cause of the failed migration by scanning the data to identify defects;

perform a remediation operation on the file-out to generate a remediated file-out by editing the data to remove any defects;

receive corrected data from a file processor;

generate a remediated file-out of the corrected data, wherein the remediated file-out comprises the corrected data in the commonly understood schema;

migrate at least a portion of the remediated file-out to the cloud provider, wherein the migration occurs asynchronously with respect to operations of the first database such that at least the portion of the remediated file-out is migrated independently without interrupting ongoing operations of the first database;

validate the migration of the remediated file-out to determine whether the migration was successful; and in response to validating the migration, generate an updated migration response indicating whether the migration was successful.

8. A computer implemented method comprising:

receiving, by a processor, a request to initiate a migration of data;

receiving, by the processor, data identified in the request to initiate a migration from a first database;

generating, by the processor, a file-out of the data by converting the data from a proprietary schema into a commonly understood schema, such that the converted data is functionally compatible with a target cloud database environment;

migrating, by the processor, at least a portion of the file-out to a cloud provider, wherein the migration occurs asynchronously with respect to operations of the first database such that the at least the portion of the file-out is migrated independently without interrupting ongoing operations of the first database;

validating, by the processor, the migration of the file-out to determine whether the migration is successful; and in response to validating the migration, generating, by the processor, a migration response indicating whether the migration was successful.

9. The computer implemented method of claim 8, the method further comprising:

in response to receiving notification of a successful migration:

deleting, by the processor, the data in the first database; and storing, by the processor, a record of the successful migration in an audit log.

10. The computer implemented method of claim 8, further comprising:

in response to receiving a notification of a failed migration:

determining, by the processor, a cause of the failed migration;

performing, by the processor, a remediation operation on the file-out to generate a remediated file-out; and migrating, by the processor, the remediated file-out to the cloud provider.

11. The computer implemented method of claim 8, wherein generating the file-out comprises pre-processing the file-out prior to sending the file-out to the cloud provider by converting the file-out into a compatible structure readable by the cloud provider.

12. The computer implemented method of claim 8, further comprising:

in response to receiving notification of a failed migration:

receiving, by the processor, corrected data from a file processor;

generating, by the processor, a remediated file-out of the corrected data, wherein the remediated file-out comprises the corrected data in the commonly understood schema;

migrating, by the processor, at least a portion of the file-out to the cloud provider;

validating, by the processor, the migration of the file-out to determine whether the migration is successful; and in response to validating the migration, generating, by the processor, an updated migration response indicating whether the migration was successful.

13. The computer implemented method of claim 8, further comprising:

receiving, by the processor, an identification code for the data, wherein the migration response further comprises the identification code; and storing, by the processor, a record of the migration response including the identification code in an audit log.

14. The computer implemented method of claim 13, wherein validating that the migration of the file-out is allowed comprises reviewing the identification code for permissions to proceed with the migration.

15. A non-transitory computer-readable medium comprising instructions that are executable by a processor for causing the processor to:

receive, from a user interface (UI) application, a request to initiate a migration of data;

receive, from a first database, data identified in the request to initiate a migration from a first database;

generate a file-out of the data by converting the data from a proprietary schema into a commonly understood schema, such that the converted data is functionally compatible with a target cloud database environment;

migrate at least a portion of the file-out to a cloud provider, wherein the migration occurs asynchronously with respect to operations of the first database such that the at least the portion of the file-out is migrated independently without interrupting ongoing operations of the first database;

validate the migration of the file-out to determine whether the migration is successful; and in response to validating the migration, generate a migration response indicating whether the migration was successful.

16. The non-transitory computer-readable medium of claim 15, wherein the instructions are further executable by the processor to cause the processor to, in response to receiving notification of a successful migration:

delete the data in the first database; and store a record of the successful migration in an audit log.

17. The non-transitory computer-readable medium of claim 15, wherein the instructions are further executable by the processor to cause the processor to, in response to receiving a notification of a failed migration:

determine a cause of the failed migration;

perform a remediation operation on the file-out to generate a remediated file-out; and migrate the remediated file-out to the cloud provider.

18. The non-transitory computer-readable medium of claim 15, wherein generating the file-out comprises pre-processing the file-out prior to sending the file-out to the cloud provider by converting the file-out into a compatible structure readable by the cloud provider.

19. The non-transitory computer-readable medium of claim 15, wherein the instructions are further executable by the processor to cause the processor to, in response to receiving notification of a failed migration:

receive corrected data from a file processor;

generate a remediated file-out of the corrected data, wherein the remediated file-out comprises the corrected data in the commonly understood schema;

migrate at least a portion of the file-out to the cloud provider;

validate the migration of the file-out to determine whether the migration is successful; and in response to validating the migration, generate an updated migration response indicating whether the migration was successful.

20. The non-transitory computer-readable medium of claim 15, wherein the instructions are further executable by the processor to cause the processor to:

receive an identification code for the data, wherein the migration response further comprises the identification code; and store a record of the migration response including the identification code in an audit log.

* * * * *